July 27, 1937. W. J. PODBIELNIAK 2,088,385
CONTROL APPARATUS
Filed July 21, 1934    3 Sheets-Sheet 3
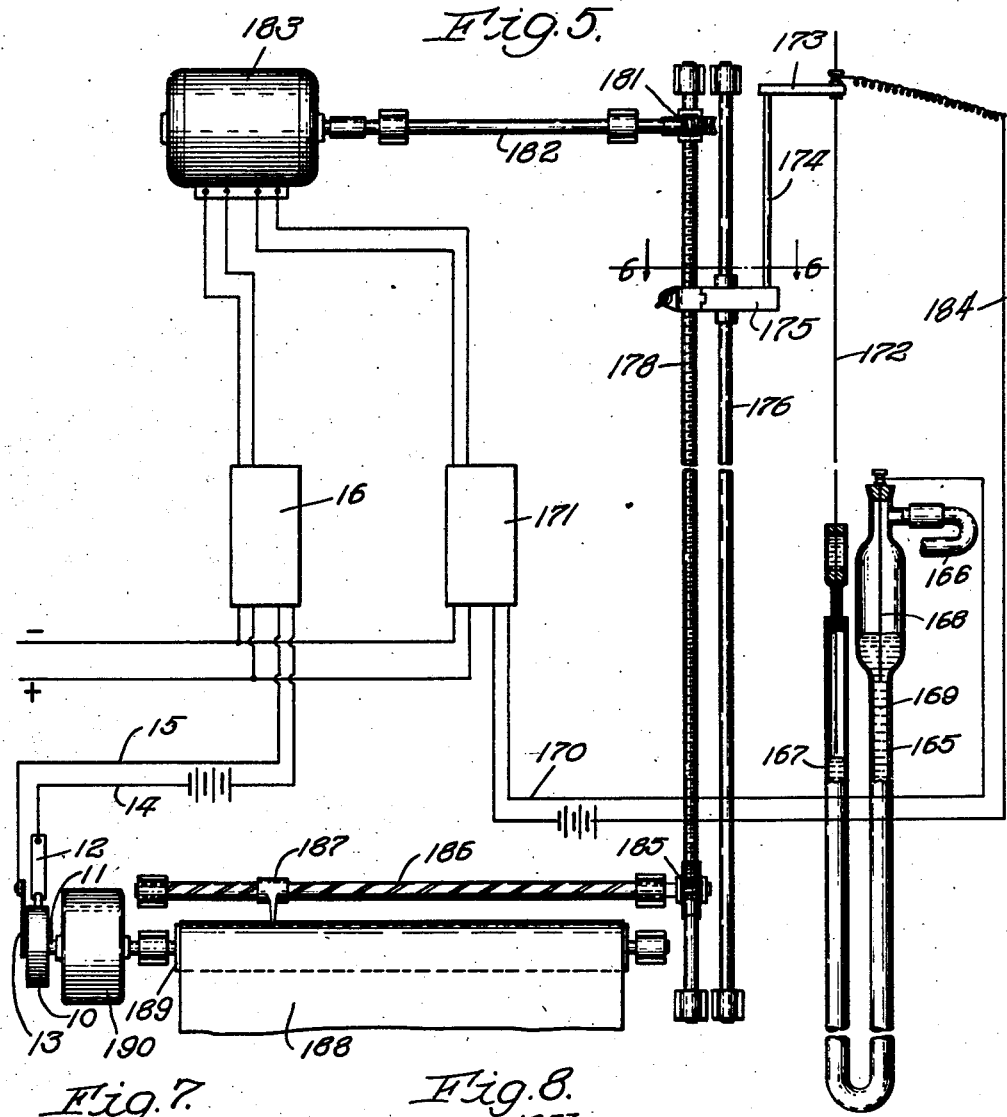
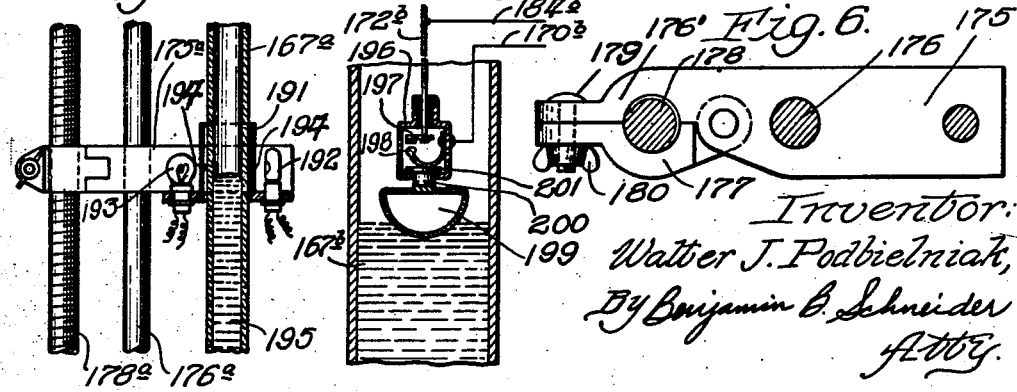
Inventor:
Walter J. Podbielniak,
By Benjamin B. Schneider
Atty Patented July 27, 1937

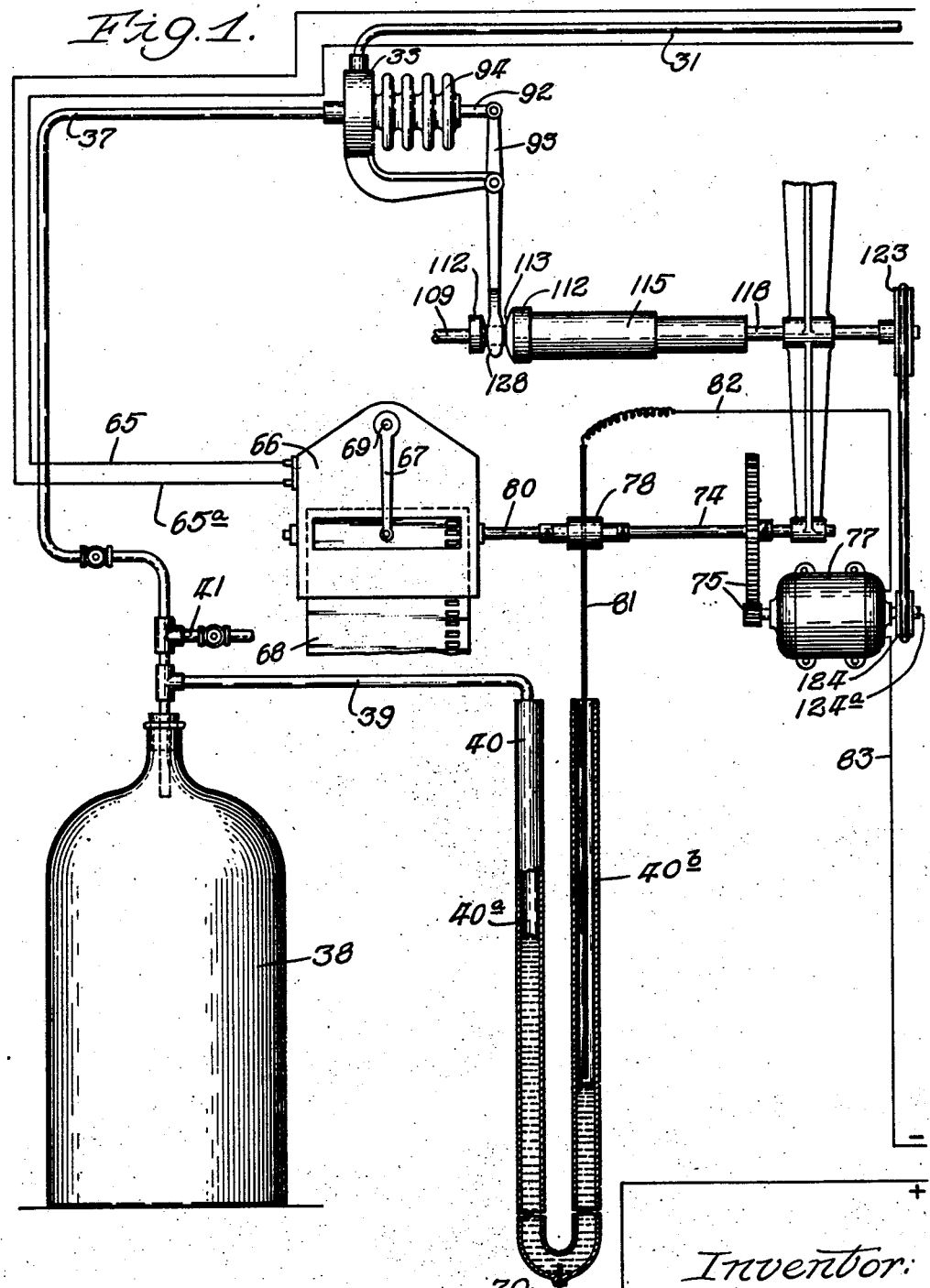

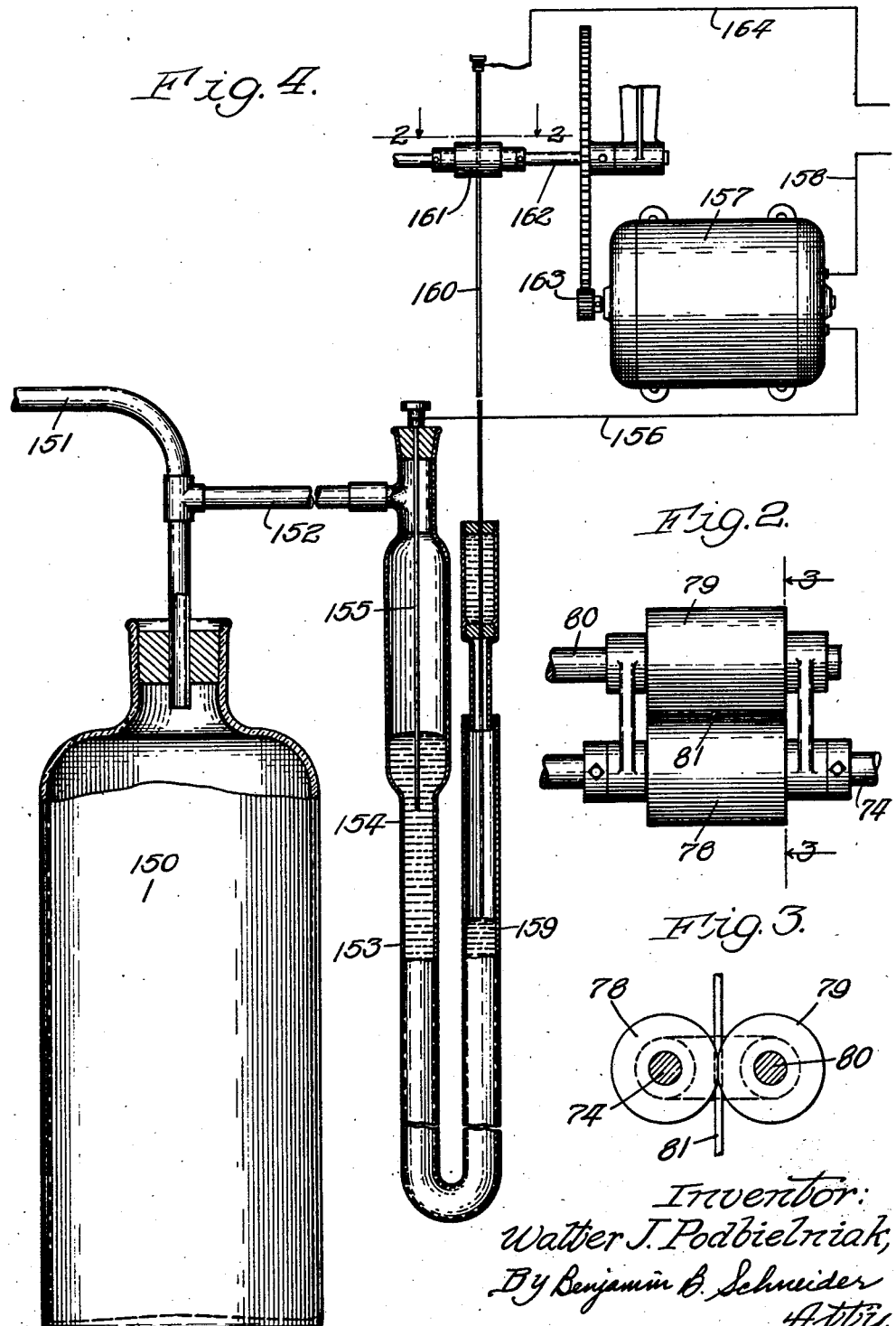

2,088,385

UNITED STATES PATENT OFFICE 2,088,385

CONTROL APPARATUS

Walter J. Podbielniak, Chicago, Ill.

Application July 21, 1934, Serial No. 736,327

8 Claims. (Cl. 50—10)

The present invention relates to improvements in control apparatus suitable for various purposes, for example, in fractional distillation. This application is a continuation in part of my prior application Serial No. 572,146, filed October 30, 1931, now Patent No. 1,967,258 granted July 24, 1934.

The present invention will be fully understood from the accompanying specification, illustrated by the accompanying drawings, in which:

Figure 1 is a general view, partly in elevation, and largely diagrammatic without reference to scale, of a layout of apparatus suitable for carrying the invention into effect;

Fig. 2 is a plan view of a detail of drive mechanism shown in Fig. 1;

Fig. 3 is a sectional view on the line 3—3 of Fig. 2;

Fig. 4 is a view, partly in elevation and partly in section, of a modified form of apparatus in accordance with the present invention;

Fig. 5 is a diagrammatic view, partly in section, of a further modified form of apparatus in accordance with the present invention;

Fig. 6 is a sectional view on the line 6—6 of Fig. 5;

Fig. 7 is a sectional view of a detail of a modified form of apparatus to be used, for example, in connection with the apparatus shown in Fig. 5; and Fig. 8 is another detail sectional view of a modified form of apparatus for use in connection with the present invention.

Referring more particularly to Fig. 1, the numeral 31 indicates a conduit through which a selected gas or vapor is supplied to the system to which the control apparatus of the present invention may be supplied. The selected gas may be derived from a fractional distillation apparatus, for example, an apparatus of the analytical type as described in my prior applications Serial No. 351,726, filed April 1, 1929, now Patent No. 2,009,534, granted July 30, 1935, Serial No. 475,574 filed Aug. 15, 1930, and Serial No. 475,585, filed August 15, 1930, and now Patent No. 1,917,272, granted July 11, 1933, and my Patent No. 1,967,258, hereinbefore referred to. As is readily apparent, the gas or fluid reaching the conduit 31 may be derived from any other suitable source.

The conduit 31 extends to the control valve mechanism 33, the construction and operation of which is fully set forth in my Patent No. 1,967,258.

From the control valve 33, vapors from the distilling conduit or vapor conduit 31 are conducted through the line 37 to the receiving bottle or container 38 which, in the form illustrated, may be a reduced pressure container in which the contents thereof are at a temperature such as to be in vapor form, as fully described in my applications previously referred to. It is readily apparent that any other suitable form of container may be employed. As herein illustrated, it is of a fixed volume and the increase of pressure in it resulting from the receipt therein of vapors from the conduit 31 is communicated by a connection 39 from the line 37 to a manometer 40 in which the pressure in the receiving container 38 is indicated and by which a further control of the operation secured, as hereinafter set forth.

The apparatus of the present invention is such as to secure control and record of the operation, or either of them, through variations of level within the manometer 40, or, if desired, but one of these results may be secured. As shown, for example, in Fig. 1, control may be secured in this manner of the feed of the paper sheet 66 of a pyrometer or other suitable recording instrument 67, and likewise of the operation of the control valve 33.

As illustrated, the manometer 40 is of the U-tube type, having a closed leg 40a communicating with the evacuated receiver 38 and the line 37, and containing a column of mercury or other suitable conductive liquid which is connected through a conductor 70 with one pole of a suitable source of electricity.

With pressure increase in the line 37, a corresponding movement of the liquid in the manometer 40 is caused. This may be employed to cause operation of a control motor or other suitable mode of mechanism in the following manner:

A motor 77 drives, through suitable reduction gears 75, a shaft 74, upon which there is mounted a soft rubber roll 78, as shown more particularly in Figs. 2 and 3. The soft rubber roll contacts closely with a similar soft rubber roll 79, mounted upon a countershaft 80. Extending into the open leg 40b of the manometer 40, there is provided an elongated metallic contact rod 81, the end of which is, in its normal position, but a very slight distance above the mercury column in the manometer, say 0.1 mm. The rod 81 extends vertically upward and passes between the rubber rolls 78 and 79 so that, when the motor 77 is driven to operate the shaft 74, the rubber roll 78 is driven and coacts with the rubber roll 79 to raise the contact rod 81. In the form illustrated, the shaft 74 is likewise employed to drive the paper roll of the pyrometer 67.

When an increase of pressure occurs in the container 36 or in the line 37, it is communicated through the line 39 to the manometer 40. The mercury is thereby caused to rise in the leg 40b of the manometer, and contact is made with the rod 81, whereupon a circuit is closed through the mercury, the contact rod 81, the connector 82, the motor 77 and the connector 83 to the opposite pole of the source of current supplied. The motor 77 is thereby energized to rotate the shaft 74 and, in the case illustrated, also the feed roll for the paper sheet of the recorder 87. By rotation of the shaft 74, through the resulting movement of the rubber roll 78, the contact rod 81 is raised and as soon as it breaks contact with the mercury in the manometer, the circuit through the motor 77 is broken and operation thereof ceases. In the form illustrated, a corresponding movement of the paper roll of the recorder 87 has been caused.

The operation of the manometer 40 and the movement of the level of the mercury therein may likewise be employed to control the operation of the control valve 33. This may be done, for example, by the following means:

From the motor shaft extension 124a of the motor 77, drive pulley 124 causes corresponding movement of a pulley 123 on the shaft extension 119 of an actuating cylinder 115, the internal construction of which is more fully described in my Patent No. 1,967,258, hereinbefore referred to.

The control valve 33 is operated to effect opening or closing movement by means of the valve-stem 92, which in turn is operated by the lever 93. To avoid leakage, a metallic bellows diaphragm 94 may be securely attached to the casing of the valve 33 and surround the valve-stem 92, being attached at its outer end to the latter. The lever 93 is provided at its end with a yoke 128 which passes around a constriction 113 of a cap 112 mounted on the end of the cylinder 115. The cylinder 115 is longitudinally movable upon the shaft 109, as described in my prior application hereinbefore referred to, and such longitudinal movement is caused by rotation of the shaft 119.

It is apparent that operation of the motor 77, initiated by contact of the metallic rod 81 with the conductive liquid or mercury in the manometer leg 40b will also, through the mechanism just described, cause movement of the cylinder 115 and through it operation of the valve mechanism 94 of the control valve 33. At the same time, the operation of the motor 77, as hereinbefore described, results in a separation of the metallic rod 81 from the mercury, thereby breaking the motor circuit and discontinuing the operation of the motor and with it the operation of the control valve 33.

In Fig. 4, I have shown a modified form of apparatus embodying the present invention, wherein the control mechanism is operated through the level of a conductive fluid in a manometer, as in the form illustrated in Fig. 1, the contacts for the control of the operation being, however, in the opposite legs of the manometer. In the form of apparatus illustrated in Fig. 4, the numeral 150 indicates a receiver for gas, vapor or other fluid medium, introduced suitably through a conduit 151. Connected to this conduit and hence to the receiver through a line 152 is a U-tube manometer 153, containing a conductive liquid, such as mercury. In one leg 154 of this manometer there is inserted a metallic rod 155, which protrudes through the closed end of the manometer leg 154 and is connected by a conductor 156 to one pole of the motor 157. The motor is connected to one pole of a source of current supply through the conductor 158.

In the opposite leg 159 of the manometer 153, there is introduced the movable contact rod 160, which, like the movable contact rod 81 in the form illustrated in Fig. 1, is operable through rubber rolls 161 mounted upon the shaft 162 driven through reducing gearing 163 by the motor 157. The metallic rod 160 is connected by a suitable conductor 164 with the opposite pole of the source of current supply for the motor.

As in the apparatus described in connection with Fig. 1, an increase in pressure in the line 151 or the container 150 is communicated to the manometer 153 and causes a rise in level of the liquid in the manometer leg 159. The end of the contact rod 160 is normally but a very slight distance above the level of the liquid, and the rise in level of the liquid causes contact to be made, closing the circuit through the motor 157 and operating the latter to rotate the rubber rolls 161 and thereby move the rod a slight distance away from the mercury level. The circuit through the motor 157 is thereby broken and movement of the rod 160 ceases until a further pressure rise or a rise in level of the mercury in the manometer leg 159 again causes contact to be made and the motor circuit to be closed.

A further modified form of apparatus suitable for carrying the present invention into effect is shown in Fig. 5. In this form of construction, a U-tube manometer 165 is illustrated, of a general form similar to that shown in Fig. 4. The closed side of this manometer is affected by pressure communicated to it through the conduit 166 and this causes changes in level of the mercury in the manometer leg 167. A permanent contact is made through the metallic rod 168 and the conductive liquid (for example, mercury) 169 in the manometer 165 and through the connector 170 to one pole of a relay 171, illustrated diagrammatically.

Projecting into the leg 167 of the manometer, there is a movable connector rod 172, which is secured to a projecting rod 173 mounted on a vertical pin or rod 174 attached to a slider 175. This slider is movably mounted on a rod 176, positioned to guide the movement of the connector rod 172 within the manometer leg 167.

The slider 175 projects beyond the rod 176 and at its outer end is provided with a suitably threaded fixed portion 176' and a movable portion 177 pivotally mounted on the slider 175. Each of these portions of the projecting end of the slide is provided with a threaded semi-cylindrical opening, so arranged that a threaded rod 178 may be embraced thereby. The fixed and movable portions 176' and 177 of the slider 175 may be held together in their operating position surrounding the threaded rod 178 by any suitable means, for example, the bolt 179 and wing-nut 180.

The threaded rod 178 is mounted parallel to the rod 176, and the former is rotatably driven through worm-gearing 181 from the shaft 182 of the motor 183. Rotation of the threaded rod 178 by the motor 183 causes vertical movement of the slider 175 along the rod 176, and with it a vertical movement of the connector rod 172 in the manometer 167. It is thus apparent that in operation, the end of the connector rod 172 being normally slightly above the level of the mercury in the manometer leg 167, an increase in pressure communicated to the manometer through the line 166 will cause a rise of the level of the mercury in the manometer leg 167 and will close the circuit through the rod 172, the connector 184, the relay 171, the connector 170 and the rod 168 which contacts with the mercury in the manometer. The resulting operation of the relay in turn causes the motor 183 to operate; its operation, through the shaft 182, the worm-gearing 181, the threaded rod 178 and the slider 175 causes movement of the rod 172, withdrawing it from contact with the mercury. The circuit through the relay 171 is thereby broken and operation of the motor 183 stopped until a further rise in level of the mercury or other conductive fluid in the manometer leg 167 takes place.

Suitable indicating or recording mechanism may be simultaneously operated by the motor 183. For example, the rotation of the threaded rod 178 resulting from the operation of the motor as hereinbefore described may be communicated through worm-gearing 185 to a threaded rod 186, causing movement of a slider 187 with respect to a recording sheet 188 mounted upon a roll 189 driven from a suitable source, for example, a clock-work motor 190. In this manner, the movement of the rod 172 caused by changes in level of the manometer 167 may be caused to secure indicating or recording data.

The contact rod 172 may, if desired, be forced to follow downward movements of the level of the control liquid by means illustrated in Fig. 5. The clock-work motor 190 (or any other suitable device) may be caused to drive the contact wheel 10 through shaft 11, thereby making a short contact at regular intervals with the contact members 12 and 13. A circuit is thereby closed for the period of contact through connectors 14 and 15 and relay 16, which in turn causes a circuit to be closed through motor 183 to operate it in a reverse direction from the operation caused by relay 171. The resulting operation causes limited downward movements of the slider 175 and with it of rod 172. As is readily apparent, if the level of the control liquid has not receded, the rod 172 will contact the liquid, initiating thereby its own upward movement until it no longer contacts the liquid, as hereinbefore described. However, if the liquid has receded, the rod will make a succession of short downward movements until it finds the level of the control liquid.

It will be apparent that this or other suitable mechanism for periodically reversing the control rod may also be employed for following a level or movement of an irregularly moving material or body in conjunction with the photosensitive actuating mechanism and other control devices hereinafter described.

In Fig. 7 is shown a modified form of apparatus suitable for use, for example, in the case of a manometer containing a non-conductive liquid or a liquid having light absorptive properties or which is opaque. In this form of construction, a photoelectric cell is employed.

As illustrated in Fig. 7, 178a indicates a threaded rod driven by a motor and corresponding to the rod 178 in the form of the device illustrated in Fig. 5. This rod causes movement of the slider 175a, guided by the rod 176a. The slider 175a in the form illustrated in Fig. 7 is provided with an opening surrounded by a sleeve 191, through which passes a leg 167a of a pressure responsive manometer or other device containing a liquid, such as a level gauge. On the slider, on opposite sides of the sleeve 191, there are mounted a photo-electric cell 192 and a light bulb or other suitable source of illumination 193. Slit openings are provided in the sleeve 191, as indicated at 194, to permit the passage of a beam of light from the bulb 193 to the photoelectric cell 192. The liquid in the column 167a is indicated by the numeral 195.

Normally, the slider 175a is so positioned that the beam of light affecting the photoelectric cell 192 travels a path slightly above the level of the liquid 195. On rise in level of the liquid, the beam of light is intercepted, thereby affecting the photoelectric cell which in turn, through suitable relays, as in the form illustrated in Fig. 5, causes operation of the motor which rotates the threaded rod 178a, thereby again raising the slider 175 to a position permitting free passage of the beam of light and again breaking the circuit and causing the operation of the motor to stop.

Fig. 8 illustrates the details of a device which may likewise be employed in connection with a liquid of non-conductive character to operate the circuit of devices as shown in Figs. 1 and 5 respectively. In the form of device illustrated in Fig. 8, the numeral 172b indicates the rod, movement of which is to be secured as a result of changes in the level of the liquid within a column or container 167b. In this case, a permanent contact is made through the connector 184b to one pole of a motor or relay. The rod is secured at its lower end within a chamber 196 and is provided therein with a contact member 197. Another contact member 198 is movably mounted within the chamber 195. the contact member 198 being connected by a conductor 170b to the other pole of the actuating relay or to the device for closing the circuit through the operating motor. Normally the contact point of the contact member 198 is slightly below the contact member 197. Through an opening in the bottom of the chamber 196, there projects a neck of a float 199, the neck being designated by the numeral 200. Within the chamber 196, the neck 200 of the float 199 is provided with an enlargement or shoulder 201, against which the movable contact member 198 within the chamber rests. With the level of the liquid in the normal position, the float 199 is suspended from the chamber 196 by the shoulder 201 with the contact 198 out of engagement with the contact 197. When the liquid in the vessel 167b rises in level, the float 199 is raised, the contact member 198 being thereby raised to engage the contact member 197 and close the circuit through the mechanism which effects the movement of the rod 172, for example, as described in connection with Fig. 1 or Fig. 5. The resulting movement of the rod raises the chamber 196, together with the float 199, the latter dropped to its lowermost position and the contact between the contact members 197 and 198 is thereby opened and the circuit through the means for operating the rod 172b closed.

Although the present invention has been described in connection with various specific embodiments thereof, it is to be understood that the details of the mechanism illustrated are not to be regarded as limitations upon the scope of the invention, except as included in the claims.

I claim:

1. In apparatus responsive to the movable level of a liquid, and comprising a container for said liquid of movable level means adapted to be engaged by the liquid at its surface, said means being adapted, on engagement with the liquid, to close a control circuit, supporting means for said liquid engaging means, operating means affected by the control circuit and actuated by closure of the control circuit to raise said supporting means, thereby disengaging said engaging means from the liquid and causing said control circuit to open.

2. In apparatus responsive to the movable level of a liquid and comprising a container for said liquid of movable level, means adapted to be engaged by the liquid at its surface, said means being adapted, on engagement with the liquid, to close a control circuit, supporting means for said liquid engaging means, operating means affected by the control circuit and actuated by closure of the control circuit to raise said supporting means, thereby disengaging said engaging means from the liquid and causing said control circuit to open, and means for intermittently operating said supporting means to move it downwardly in the direction of the level of the liquid.

3. In apparatus responsive to the movable level of a liquid and comprising a container for said liquid of movable level, means adapted to be engaged by the liquid at its surface, said means being adapted, on engagement with the liquid, to close a control circuit, supporting means for said liquid engaging means, operating means affected by the control circuit and actuated by closure of the control circuit to raise said supporting means, thereby disengaging said engaging means from the liquid and causing said control circuit to open, and means for periodically actuating said operating means at regular intervals to cause a short downward movement of the supporting means in the direction of the level of the liquid.

4. In apparatus responsive to the movable level of a liquid, a column of transparent material adapted to contain the liquid, means movable lengthwise of said column, said means being provided with an opaque sleeve surrounding said column and provided with a slit, a photosensitive cell and a source of light adapted to normally direct a beam of light through said slit and column to the photosensitive cell whereby on rise of liquid in the column, said beam is intercepted, and means actuated from said photosensitive cell on interception of the beam of light by rise in level of the liquid for actuating said movable member to cause it to move vertically above the level of the liquid in the column, thereby permitting the beam of light to pass and causing the said operating means to cease operation.

5. In combination, a valve and operating means therefor, said operating means having a motor and an electrical control circuit, a contact member in said control circuit, liquid contact means arranged to cooperate with the first mentioned contact member for closing and opening the circuit, and means whereby the fluid controlled by said valve moves the liquid in said contact means to close the circuit, and means operated by said motor for moving said contact member and breaking the control circuit.

6. In combination, a valve and operating means therefor, said operating means having a motor and an electrical control circuit, a contact member in said control circuit, electrical conducting liquid contact means arranged to cooperate with the first mentioned contact member for closing and opening the circuit, and means whereby the fluid controlled by said valve moves the liquid in said contact means to close the circuit, and rotatable means operated by said motor for moving said contact member and breaking the control circuit.

7. An apparatus responsive to the level of a liquid, contact means adapted to be engaged by the liquid at its surface, a control circuit, said means being adapted, on engagement with the liquid, to close the control circuit, supporting means for said liquid engaging means, operating means affected by the control circuit and actuated by closure of the control circuit to operate said supporting means, thereby disengaging said contact means from the liquid and opening said control circuit.

8. I combination, an apparatus comprising a movable electrical conducting liquid and a container for said liquid, contact means adapted to be engaged by the liquid at its surface, said contact means being adapted, on engagement with the rising level of the liquid to close a control circuit, supporting means for said liquid engaging means, operating means affected by the control circuit and actuated by closure of the control circuit to operate said supporting means, thereby disengaging said engaging means from the liquid and causing said control circuit to open.

WALTER J. PODBIELNIAK.